United States Patent
Korischem et al.

(10) Patent No.: US 6,715,667 B2
(45) Date of Patent: Apr. 6, 2004

(54) METHOD OF JOINING STEEL TUBES WITH ALUMINUM RIBS

(75) Inventors: Benedict Korischem, Düsseldorf (DE); Horia Dinulescu, Minnetonka, MN (US); Raimund Witte, Dortmund (DE); Eckard Volkmer, Ratingen (DE)

(73) Assignee: GEA Energietechnik GmbH, Bochum (DE)

( * ) Notice: Subject to any disclaimer, the term of this patent is extended or adjusted under 35 U.S.C. 154(b) by 0 days.

(21) Appl. No.: 10/201,582

(22) Filed: Jul. 22, 2002

(65) Prior Publication Data

US 2003/0019915 A1 Jan. 30, 2003

Related U.S. Application Data

(63) Continuation of application No. PCT/DE01/00223, filed on Jan. 18, 2001.

(30) Foreign Application Priority Data

Jan. 28, 2000 (DE) .......................... 100 03 874
Nov. 17, 2000 (DE) .......................... 100 57 180

(51) Int. Cl.[7] .................. B23K 31/02; B23K 1/20; B23K 35/34; B23K 1/19
(52) U.S. Cl. ............... 228/183; 228/157; 228/223; 228/262.41; 228/262.42; 228/262.51; 148/23; 428/659
(58) Field of Search ................ 228/223, 183, 228/185, 157, 262, 262.4, 262.41, 262.42, 262.51; 428/659; 148/23–26; 165/148, 156

(56) References Cited

U.S. PATENT DOCUMENTS

| | | | |
|---|---|---|---|
| 2,650,420 A | * | 9/1953 | True ........................ 228/185 |
| 4,389,463 A | * | 6/1983 | Smeggil et al. ............. 428/659 |
| 5,110,035 A | * | 5/1992 | Reynolds et al. ........... 228/183 |
| 5,171,377 A | * | 12/1992 | Shimizu et al. ............. 148/23 |
| 5,190,596 A | * | 3/1993 | Timsit ........................ 148/23 |
| 5,305,945 A | * | 4/1994 | Cottone et al. ............. 228/183 |
| 5,418,072 A | * | 5/1995 | Baldantoni et al. ......... 428/558 |
| 5,490,559 A | * | 2/1996 | Dinulescu ................... 165/148 |
| 5,617,992 A | * | 4/1997 | Huddleston et al. ........ 228/183 |
| 5,799,726 A | * | 9/1998 | Frank ......................... 165/156 |
| 6,109,510 A | * | 8/2000 | Otsuka et al. ......... 228/262.51 |

FOREIGN PATENT DOCUMENTS

| | | |
|---|---|---|
| EP | 0 785045 | 7/1997 |
| EP | 0 845 321 | 6/1998 |
| EP | 0965411 A1 * | 12/1999 |
| EP | 0 965 411 | 12/1999 |
| JP | 49-076753 A * | 7/1974 |
| JP | 59-78719 A * | 5/1984 |
| JP | 59-82114 A * | 5/1984 |
| WO | WO-01/54840 A2 * | 8/2001 |

* cited by examiner

Primary Examiner—L. Edmondson
(74) Attorney, Agent, or Firm—Henry M. Feiereisen

(57) ABSTRACT

In a method for joining a steel tube with an aluminum rib, a zinc-aluminum alloy layer, having an aluminum content of 0.5% by wt. to 20% by wt., is applied to the surface of the steel tube or the aluminum rib, and then a fluxing agent in the form of cesium-aluminum tetrafluoride is applied between the steel tube and the aluminum rib at room temperature before or during the mechanical contact of the aluminum rib with the steel tube. The steel tube provided with the aluminum rib is then heated to a soldering temperature of between 370° C. and 470° C. and subjected to room temperature to cool down.

6 Claims, No Drawings

METHOD OF JOINING STEEL TUBES WITH ALUMINUM RIBS

CROSS-REFERENCES TO RELATED APPLICATIONS

This application is a continuation of prior filed copending PCT International application no. PCT/DE01/00223, filed Jan. 18, 2001.

This application claims the priority of German Patent Applications, Serial Nos. 100 03 874.3, filed Jan. 28, 2000, and 100 57 180.8, filed Nov. 17, 2000, pursuant to 35 U.S.C. 119(a)–(d), the subject matter of which is incorporated herein by reference.

BACKGROUND OF THE INVENTION

The present invention relates to a method of joining steel tubes with aluminum ribs.

It is conventional to produce ribbed tubes for air-cooled plants or air-cooled condensers from steel tubes and steel ribs. Securement of the steel ribs to the steel tubes is realized through hot-galvanizing. Even though such ribbed tubes are very corrosion-resistant, they suffer the drawback that the ribs are made of relatively poor heat conducting steel.

It is further known to wind continuous aluminum ribs in helical manner onto round steel tubes. The aluminum ribs may hereby be wound with narrow foot-side legs under tension in flat engagement onto the surfaces of the steel tubes. Another possibility involves a grooving of the surfaces of the steel tubes and the placement of aluminum ribs in the grooves. A drawback of winding aluminum ribs onto steel tubes resides in the different thermal expansion coefficients between steel and aluminum. In practical terms, this means that steel tubes with aluminum ribs can only be used up to relatively low temperatures of about 130° C. At higher temperatures, the contact between the aluminum ribs and the steel tubes gets lost as a consequence of the greater thermal expansion of aluminum. The capability of the ribbed tubes drops.

A further conventional method of making ribbed tubes involves the connection of aluminum-plated flat tubes with the assistance of aluminum-silicon solder with undulated or meandering or angularly folded webs of aluminum ribs in an annealing furnace. The bond between aluminum ribs and flat tubes through soldering with aluminum-silicon solder, which is a component of the aluminum ribs or the flat tubes, has the drawback that such soldering can be produced only via the detour of using aluminum-plated flat tubes or plated aluminum ribs. Apart from the comparably high expenditure in view of the need for diverse starting materials and during production, there is the added drawback that the flat tubes, closed in circumferential direction by at least one longitudinal welding seam, must not be plated with aluminum in the welding zone. Otherwise, a reliable welding operation cannot be assured. These regions of the flat tubes must be freed subsequently from welding by-products and then protected against corrosion.

A further drawback of ribbed tubes consisting of flat tubes with folded aluminum bands is the need to carry out the soldering operation of the aluminum-plated flat tubes with aluminum ribs at comparably high temperatures in the order of about 600° C., i.e. near the softening temperature of aluminum. The solder, required hereby, is made of aluminum-silicone eutectic which melts slightly below the softening point of aluminum.

Also, with respect to this structural type, it is to be noted that as a consequence of the different thermal expansion coefficients between aluminum and steel, both soldered materials may substantially distort relative to one another, when cooled down to the ambient temperature (room temperature) after soldering at about 600° C., so that a breakup of the soldered areas can easily be encountered, when the aluminum has not been correctly applied.

It would therefore be desirable and advantageous to provide an improved method of joining steel tubes with aluminum ribs as components of air-cooled plants and air-cooled condensers, which method obviates prior art shortcomings and can be carried out with slight labor costs and energy costs as well as cost-savings with respect to material consumption.

SUMMARY OF THE INVENTION

According to one aspect of the present invention, in a method of joining a steel tube with an aluminum rib, a layer of a zinc-aluminum alloy with an aluminum content of 0.5% to 20% is first applied onto the surface of the steel tube or the aluminum rib, and then a fluxing agent in the form of cesium-aluminum tetrafluoride is deposited between the steel tube and the aluminum rib at room temperature before or during mechanical contact of the aluminum rib with the steel tube, whereupon the steel tube provided with the aluminum rib is heated in a furnace to a soldering temperature between 370° C. and 470° C., and finally subjected to room temperature to cool down.

According to another aspect of the present invention, in a method of joining a steel tube with an aluminum rib, a layer of a zinc-aluminum alloy with an aluminum content of 0.5% to 20% is first applied onto the surface of the steel tube or the aluminum rib, and then a fluxing agent in the form of cesium-aluminum tetrafluoride is deposited upon the aluminum ribs at room temperature at least in the contact zone with the steel tube, whereupon the aluminum rib with the steel tube which has previously been heated to a soldering temperature between 370° C. and 470° C., are brought into mechanical contact, and finally subjected to room temperature to cool down.

DETAILED DESCRIPTION OF THE INVENTION

In accordance with the present invention, a solder of zinc-aluminum alloy with an aluminum content of 0.5–20% by wt., preferably 5% by wt.–15% by wt. is used, which can be applied onto the surface of a steel layer may be realized onto a surface of an aluminum rib. Application of the solder layer may be realized by means of the flame spraying process. It is hereby possible, to use acetyls or also natural gas. A wire, having the composition of the solder, is hereby melted and spread evenly upon the respective surface as a result of the gas under pressure.

A second procedure involves the application of the electric-arc process. In this case, an electric arc is produced by means of two wires having the composition of the solder, thereby melting the wires. At the same time, air or an inert gas is blown in so that the melted solder is evenly distributed onto the surfaces of the steel tubes or the aluminum ribs.

Structure and operation of a flame spraying process or electric-arc process are generally known to an artisan so that a detailed description has been omitted for the sake of simplicity.

Also, galvanization with the solder in the stated composition is conceivable.

Finally, it is also feasible to apply a layer, made of the solder composed according to the invention, onto the respective surfaces through pressure, plating or sintering.

The present invention is based on the recognition that the use of a fluxing agent in the form of cesium-aluminum tetrafluoride allows a reduction in the soldering temperature from conventionally 600° C. to a range between 370° C. and 470° C. This lowering of the soldering temperature is not only accompanied by a reduction of the solder times by about 30% by wt. to 40% by wt. but also results in a significant saving of labor costs and energy costs. A further saving is possible when only the contact zones between the aluminum ribs and the steel tubes are wetted with the fluxing agent. This may be implemented through immersion or a spray process.

It is furthermore to be considered within the scope of the invention, that the aluminum ribs are softly annealed during conventional soldering. They necessarily loose hereby part of their strength properties. This was still tolerated in the context of flat tubes with webs of aluminum ribs integrated between the flat tubes, because the webs of aluminum ribs are bound between the flat sides of the flat tubes after the soldering operation. Within the scope of the method according to the invention, both variations assure, however, a significant reduction of the soldering temperature so that soft annealing does no longer occur. Regardless of their association, the aluminum ribs maintain their full strength properties.

In the event of, e.g., fabricating ribbed tubes of elliptic configuration through placement of punched aluminum ribs onto the steel tubes and application of the fluxing agent at every location where the aluminum ribs have their final position, the aluminum ribs can conduct heat well and can be fixed on the steel tubes permanently and protected against corrosion up to operating temperatures of above 350° C.

When the aluminum ribs are attached through helical winding onto the steel tubes, the fluxing agent is suitably applied at the leading engagement point of the rib band directly before the engagement of the rib band on the surface of the steel tube. This enables to bring the steel tubes, provided with the wound aluminum ribs, to a required soldering temperature between 370° C. and 470° C. in a continuous furnace or also later in an annealing furnace.

It is, however, also conceivable to wind bands of aluminum ribs, after coating with the solder, onto steel tubes which have been heated to a soldering temperature between 370° C. and 470° C., and to utilize the latent tube heat for soldering. In this type of ribbed tubes it is rewlized that the steel tubes are protected against corrosion by the migrating solder. Further, a firm metallic heat conductive connection between the aluminum ribs and the steel tubes is realized. Ribbed tubes, fabricated in this manner, are suitable for operating temperatures of about 350° C.

When attaching undulated or meandering or angularly (triangularly or rectangularly) folded aluminum ribs onto steely flat tubes, the latter or also the aluminum ribs are provided, after application of the solder, with the special fluxing agent in the form of cesium-aluminum tetrafluoride across the entire surface area, and subsequently alternatingly an aluminum rib band, a flat tube, again an aluminum rib band, and so on, are stacked on top of one another. The thus-formed stack of aluminum ribs (cake) is then placed in a soldering furnace (continuous furnace or annealing furnace) and subjected there to the required soldering temperature between 370° C. and 470° C. The solder liquefies so that the aluminum rib bands are joined with the seal tubes in a metallic and heat-conductive manner. Moreover, the outer surface of the entire flat tube is protected against corrosion.

As an alternative, it is also possible to move flat tubes through an annealing furnace for heating to the required soldering temperature. Thereafter, the flat tubes are joined with the aluminum rib bands through use of the solder and the fluxing agent.

Regardless of the sequence of the respective production process, the respectively joined arrangement of steel tubes and aluminum ribs is then subjected to the ambient temperature (room temperature) and thereby cooled, so that the aluminum ribs are reliably joined with the steel tubes in a heat-conductive manner.

The special solder of a zinc-aluminum alloy with an aluminum content of 0.5% by wt. to 20% by wt., preferably 5% by wt. to 15% by wt., in conjunction with the special fluxing agent in the form of cesium-aluminum tetrafluoride enables a melting of the solder layer at the respectively advantageous temperature between 370° C. and 470° C. such that a melting of the aluminum ribs is precluded in any event. In this context, the driving force is the eutectic zinc/aluminum, whereby aluminum is alloyed in the solder layer, so that liquid zinc is prevented from dissolving the aluminum ribs.

The particular fluxing agent in the form of cesium-aluminum tetrafluoride may be prepared on an alkaline, acidic or neutral base.

The respective soldering temperature is dependent on the fraction of the aluminum in the solvent. The higher the aluminum fraction, the higher the soldering temperature. An advantageous embodiment is realized, when the solder has a fraction of 15% by wt. aluminum, whereby the soldering temperature is at about 430° C.

While the invention has been illustrated and described as embodied in a method of joining steel tubes with aluminum ribs, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method of joining a steel tube with an aluminum rib, comprising the steps of:
    applying a layer of a zinc-aluminum alloy with an aluminum content of 0.5% by wt. to 20% by wt. onto a surface of a steel tube or aluminum rib;
    depositing a fluxing agent in the form of cesium-aluminum tetrafluoride between the steel tube and the aluminum rib at room temperature in one of the phases selected from the group consisting of before and during mechanical contact of the aluminum rib with the steel tube;
    heating the steel tube provided with the aluminum rib in a furnace to a soldering temperature between 370° C. and 470° C.; and
    exposing the steel tube provided with the aluminum rib to room temperature to cool down,
    wherein the aluminum rib is wound onto the steel tube in a helical manner, wherein the fluxing agent is deposited onto the surface of the steel tube at a leading engagement point of the aluminum rib upon the steel tube before the aluminum rib is attached onto the steel tube.

2. The method of claim 1, wherein the aluminum content of the zinc-aluminum alloy is 5% by wt. to 15% by wt.

3. The method of claim 1, wherein the aluminum content of the zinc-aluminum alloy is 15% by wt. and the steel tube is heated to a soldering temperature of about 430° C.

4. The method of claim 1, wherein the applying step is carried out by a process selected from the group consisting of flame spraying process, electric-arc process, galvanization, pressure application, plating, and sintering.

5. A method of joining a steel tube with an aluminum rib, comprising the steps of:

applying a layer of a zinc-aluminum alloy with an aluminum content of 0.5% by wt. to 20% by wt. onto a surface of a steel tube or aluminum rib;

depositing a fluxing agent in the form of cesium-aluminum tetrafluoride upon the aluminum rib at room temperature at least in an intended contact zone with the steel tube;

heating the steel tube to a soldering temperature between 370° C. and 470° C.; placing the aluminum rib onto the steel tube; and exposing the steel tube provided with the aluminum rib to room temperature to cool down.

6. A method of joining a steel tube with an aluminum rib, comprising the steps of:

applying a layer of a zinc-aluminum alloy with an aluminum content of 0.5% by wt. to 20% by wt. onto a surface of an aluminum rib;

heating the steel tube to a soldering temperature between 370° C. and 470° C.; and depositing a fluxing agent in the form of cesium-aluminum tetrafluoride at a leading engagement point of the aluminum rib upon the steel as the aluminum rib is wound onto the steel tube in a helical manner.

\* \* \* \* \*